US006239373B1

(12) United States Patent
Sato et al.

(10) Patent No.: US 6,239,373 B1
(45) Date of Patent: May 29, 2001

(54) END STRUCTURE FOR A SHIELDING WIRE AND METHOD OF PRODUCING THE SAME

(75) Inventors: Kei Sato; Yasumichi Kuwayama; Shigeji Kudo; Shoichi Watanabe; Nobuaki Yamakawa, all of Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/228,640

(22) Filed: Jan. 12, 1999

(30) Foreign Application Priority Data

Jan. 13, 1998 (JP) .............................................. 10-005040

(51) Int. Cl.[7] .................................................. H02G 15/02
(52) U.S. Cl. ........................................................ 174/75 C
(58) Field of Search .................................. 174/74 R, 78, 174/65 R, 84 R, 75 C; 439/98, 99, 100; 29/825, 850, 862, 872

(56) References Cited

U.S. PATENT DOCUMENTS 3,546,365 * 12/1970 Collier ................................... 174/78
3,897,127 * 7/1975 Haitmanek ............................. 439/98
5,691,506 * 11/1997 Miyazaki et al. .................. 439/98 X
5,994,646 * 11/1999 Broeksteeg et al. ............... 174/74 R
6,026,563 * 2/2000 Schilson ................................ 29/825

FOREIGN PATENT DOCUMENTS

0803953A2 4/1997 (EP) .
2 035 718 6/1980 (GB) .
2 126 022 3/1984 (GB) .
8-78071 3/1996 (JP) .

OTHER PUBLICATIONS

United Kingdom Search Report, Apr. 1999.

* cited by examiner

*Primary Examiner*—Dean A. Reichard
*Assistant Examiner*—Chau N. Nguyen
(74) *Attorney, Agent, or Firm*—Finnegan, Henderson, Farabow, Garrett & Dunner, L.L.P.

(57) ABSTRACT

An end structure for a shielding wire is provided with a covering part 20 for covering an end portion 18*b* of a braided wire 18. In arrangement, an end 19*a* of an outside insulating rind 19 is positioned so as to recede from an end 18*a* of the braided wire 18. The covering part 20 is welded to an inside insulating rind 17 in the vicinity of the end portion 18*b* of the braided wire 18. Owing to the provision of the covering part 20, it is possible to prevent the braided wire 18 from being loosen from the end portion 18*b*.

8 Claims, 7 Drawing Sheets

END STRUCTURE FOR A SHIELDING WIRE AND METHOD OF PRODUCING THE SAME

BACKGROUND OF THE INVENTION

The present invention relates to an end structure for a shielding wire and a method of producing the end structure. More particularly, it relates to the end structure for an end portion of braided wire constituting the shielding wire and the method of producing the end portion.

For example, Japanese Unexamined Patent Publication (Kokai) No. 8-78071 discloses a prior art end structure for the shielding wire. According to the disclosed method of producing the end structure, an outside insulating rind of the shielding wire is firstly taken off to expose the braided wire and then, the exposed braided wire is folded back to lie on the outside insulating rind. Thereafter, an inside insulating rind is taken off to expose a core line of the shielding wire.

The inside insulating rind of the shielding wire is fixed to a terminal by inserting the inside insulating rind into a retainer part of the shielding wire and sequentially crimping the retainer part and a connecting part of the terminal, so that the core line of the shielding line is electrically connected to the terminal. Then, the so-fixed terminal is inserted into a cylindrical shielding terminal, so that the braided wire is electrically connected to the shielding terminal at the interior of the shielding terminal.

The electrical connection between the shielding terminal and the braided wire is completed by providing a plate spring folded back in the shielding terminal and sequentially contacting the plate spring with the braided wire electrically. The so-assembled shielding terminal is inserted into a housing while fitting a cap to an opening end of the shielding terminal.

According to the above-mentioned terminal management structure, since there is no need to expose the braided wire longer thereby to abolish various works to twist the braided wire, insert them into a thermal shrinking tube, crimp the shielding terminal to the braided wire for electrical connection, or the like, the workability in managing the terminal can be improved.

In the above-mentioned terminal management structure, however, it is necessary to provide the shielding terminal, therein, with the plate spring for electrical connection between the shielding terminal and the braided wire of the shielding wire, so that the structure of the shielding terminal is complicated to cause the troublesome manufacturing for the shielding terminal.

Additionally, the terminal management structure requires to establish a large spring load of the plate spring in order to avoid an incomplete contact of the plate spring with the braided wire. On the contrary, when over-increasing the spring load of the plate spring, it becomes difficult to insert the braided wire into the plate spring. Further, the large-established spring load for the plate spring would cause the braided wire to be withdrawn from the plate spring for incomplete contact between the plate spring and the braided wire.

The terminal management structure further includes a problem that the braided wire gradually comes loose since a terminal portion of the braided wire remains to be exposed with no treatment.

SUMMARY OF THE INVENTION

It is therefore a first object of the present invention to provide an end structure for a shielding wire and a method of producing the end structure of the shielding wire, by which it is possible to prevent the terminal portion of the braided wire from being loosen. It is a second object of the present invention to provide the end structure and the method of producing the end structure of the shielding wire, by which an end portion of a shielding terminal can be simplified thereby to provide the facilitated and reliable connection between the shielding terminal and the braided wire.

As the first aspect of the invention, the above-mentioned objects can be accomplished by an end structure for a shielding wire including a core part made of conductive material, an inside insulating rind covering the core part, a braided wire arranged about the inside insulating rind and an outside insulating rind arranged about the braided wire to cover the core part, the inside insulating rind and the braided wire, the end structure comprising:

a covering part which is separated from an end of the outside insulating rind so as to cover the circumference of an end portion of the braided wire, the end of the outside insulating rind being positioned so as to recede from an end of the braided wire to the opposite side of a leading end of the shielding wire, wherein the covering part is welded to the inside insulating rind in the vicinity of the end of the braided wire, According to the above-mentioned end structure, the covering part is provided apart from the end of the outside insulating rind so as to cover the end portion of the braided wire. Further, the covering part is welded to the inside insulating rind. Thus, the end portion of the braided wire is covered and secured with the covering part. Consequently, it is possible to eliminate a possibility that the braided wire begins to be loosen from the end portion.

Preferably, the end structure further comprises a shielding terminal which is connected with the braided wire between the covering part and the outside insulating rind.

In this structure, the outside insulating rind is cut in the vicinity of the end portion and sequentially shifted toward the end of the braided wire, thereby providing the covering part. Under such a situation, a part of the braided wire is exposed between the covering part and the end of the outside insulating rind. Therefore, according to the second aspect, there is no need to peel the outside insulating rind in order to expose the braided wire. Further, owing to the arrangement where the shielding terminal is connected to the exposed braided wire, it is possible to facilitate the connecting operation between the shielding terminal and the braided wire while preventing the end portion of the braided wire from being loosen.

Preferably, the covering part is welded to the inside insulating rind by means of ultrasonic oscillation.

In this structure, owing to the ultrasonic welding, the end portion of the braided wire can be covered with the covering part certainly, whereby it is possible to prevent the braided wire from being loosen from the end portion. In addition, it is also possible to weld the covering part to the inside insulating rind locally and rapidly.

Preferably, the shielding terminal has an end portion pasted with a welding material having a low melting point and the end portion of the shielding terminal is conductive-connected to a portion of the braided wire between the covering part and the end of the outside insulating rind through the welding material by means of ultrasonic oscillation.

In this case, owing to the welding material's fusing by ultrasonic oscillation, the end portion of the shielding terminal is metallically joined to the braided wire for conductive connection.

Preferably, the end portion of the shielding terminal is conductive-connected to the portion of the braided wire between the covering part and the end of the outside insulating rind at the same time of welding the covering part to the inside insulating rind by means of ultrasonic oscillation.

In this case, it is possible to connect the shielding terminal with the braided wire and also connect the covering part to the inside insulating rind at one ultrasonic oscillation.

Preferably, the covering part is welded to the inside insulating rind at a plurality of regions in the circumferential direction of the shielding wire by means of ultrasonic oscillation.

In this case, it is possible to weld the covering part to the inside insulating rind more firmly.

Preferably, the covering part is welded to the inside insulating rind through a whole area thereof in the circumferential direction of the shielding wire by means of ultrasonic oscillation.

In this case, since the covering part is welded to the inside insulating rind through the whole circumference, the appearance of the covering pan can be improved. Furthermore, since the covering part is uniformly welded to the inside insulating rind, it is possible to stick the end portion of the braided wire to the inside insulating rind strongly.

According to the second aspect of the present invention, there is also provided a method of producing an end structure for a shielding wire including a core part made of conductive material, an inside insulating rind covering the core part, a braided wire arranged about the inside insulating rind and an outside insulating rind arranged about the braided wire to cover the core part, the inside insulating rind and the braided wire, the method comprising the steps of:

forming an end of the shielding wire in a manner that an end of the braided wire at least recedes from an end of the inside insulating rind and an end of the outside insulating rind recedes from the end of the braided wire;

cutting an end portion of the outside insulating rind at a predetermined length, thereby forming a covering part for covering the end of the braided wire;

shifting the covering part toward the end of the inside insulating rind so as to cover the end portion of the braided wire; and welding the inside insulating rind to the covering part while the end portion of the braided wire is covered with the covering part.

According to the above-mentioned method, the covering part is separated from the end of the outside insulating rind so as to cover the end portion of the braided wire. Thereafter, the covering part is welded to the inside insulating rind. Thus, the end portion of the braided wire is covered and secured with the covering part. Consequently, it is possible to easily eliminate a possibility that the braided wire begins to be loosen from the end portion, Preferably, the above-mentioned method further comprises the step of:

connecting an end portion of a shielding terminal with the braided wire exposed between the covering part and the outside insulating rind.

In this case, owing to the provision of the shielding terminal, it is possible to extend a conductive part associated with the braided wire on an extending level with a leading end of the shielding wire.

Preferably, in the method mentioned above, the covering part is welded to the inside insulating rind by means of ultrasonic oscillation.

In this case, owing to the ultrasonic welding, the end portion of the braided wire can be covered with the covering part certainly, whereby it is possible to prevent the braided wire from being loosen from the end portion. In addition, it is also possible to weld the covering part to the inside insulating rind locally and rapidly.

Preferably, the method further comprises the steps of:

putting an end portion of the shielding terminal on the braided wire exposed between the covering part and the outside insulating rind, the end portion of the shielding terminal being pasted with a welding material having a low melting point; and oscillating the end portion of the shielding terminal and the braided wire with ultrasonic waves together with the welding of the covering part with the inside insulating rind.

In this case, it is possible to carry out the welding operation between the covering part and the inside insulating rind simultaneously with the conductive connecting between the shielding terminal and the braided wire, whereby the number of manufacturing steps can be reduced.

Preferably, in the method of the invention, the covering part is welded to the inside insulating rind at a plurality of regions in the circumferential direction of the shielding wire by means of ultrasonic oscillation.

In this case, it is possible to weld the covering part to the inside insulating rind more firmly.

Preferably, in the method of the invention, the covering part is welded to the inside insulating rind through a whole area thereof in the circumferential direction of the shielding wire by means of ultrasonic oscillation.

Also in this case, since the covering part is welded to the inside insulating rind through the whole circumference, the appearance of the covering part can be improved. Furthermore, since the covering part is uniformly welded to the inside insulating rind, it is possible to stick the end portion of the braided wire to the inside insulating rind strongly.

These and other objects and features of the present invention will become more fully apparent from the following description and appended claims taken in conjunction with the accompany drawing.

BRIEF DESCRIPTION OF THE DRAWINGS

FIGS. 1A and 1B show a shielding wire having a terminal managed in accordance with the terminal managing structure and method of the present invention, in which FIG. 1A is a perspective view of the shielding wire and FIG. 1B is a cross sectional view of the shielding wire;

DESCRIPTION OF THE PREFERRED EMBODIMENT

Embodiments of the present invention will be described with reference to the drawings.

[1st. embodiment]

Figure 1A:
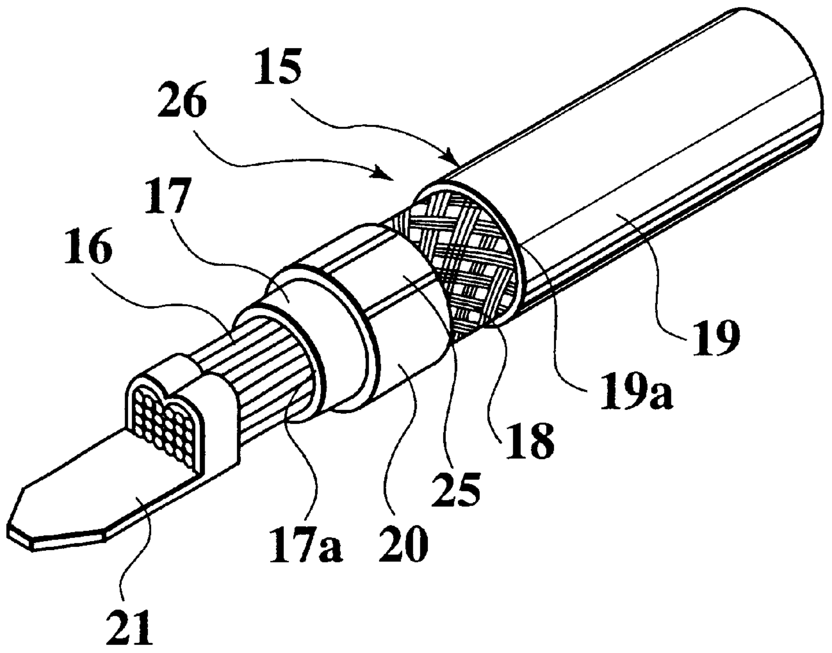
Figure 1B:
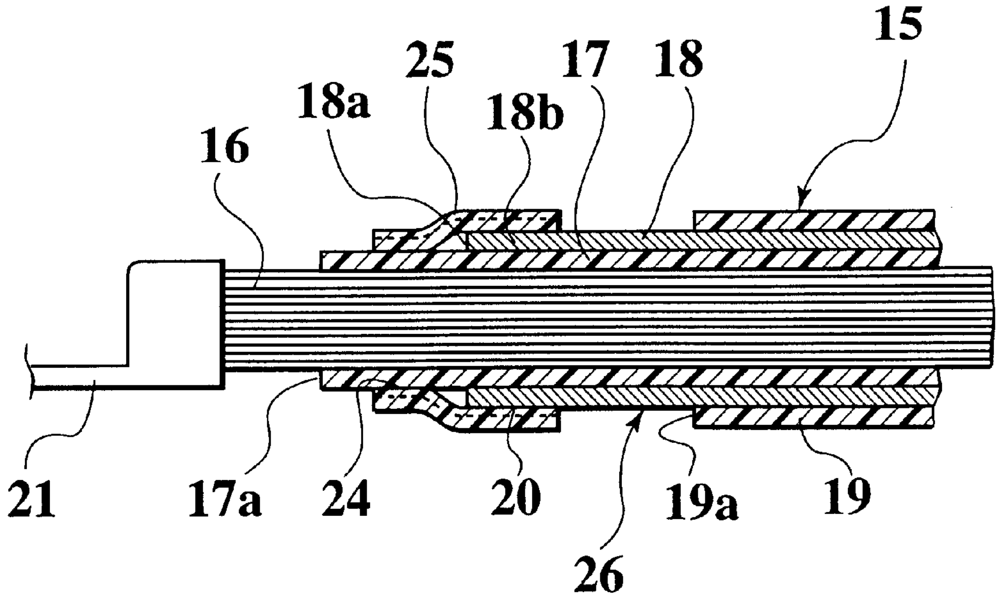

As shown in FIGS. 1A and 1B, a shielding wire 15 in accordance with the first embodiment comprises a core (lines) part 16 of conductive members, an inside insulating rind 17 covering the core part 16, a braided wire 18 arranged about the inside insulating rind 17 and an outside insulating rind 19 arranged about the braided wire 18 to cover the core part 16, the inside insulating rind 17 and the braided wire 18, also.

In the end structure of the embodiment, the shielding wire 15 further includes a covering part 20 for covering a vicinity of an end 18*a* of the braided wire 18. As shown in the figure, the covering part 20 is separated from an end face 19*a* of the outside insulating rind 19, which is positioned so as to recede from the end 18*a* of the braided wire 18 to the opposite side of a leading end of the shielding wire 15. The covering part 20 is welded to the inside insulating rind 17 in the vicinity of an end portion 18*b* of the braided wire 18.

Note, in FIGS. 1A and 1B, reference numeral 21 denotes a terminal 21 crimped and connected to the core part 16.

According to the end structure for the shielding wire 15, since the end portion 18*b* of the braided wire 18 is covered with the covering part 20, there is no possibility that the braided wire 18 begins to be loosen from the end portion 18*b*.

Figure 2:
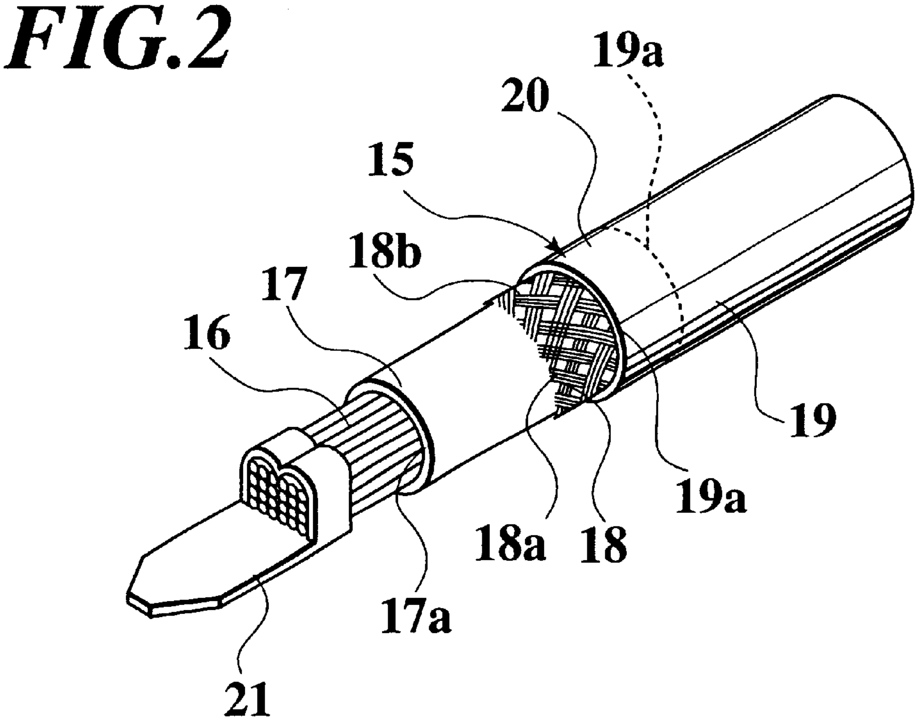
FIG. 2 is a perspective view showing a condition that the end portion of the shielding wire is peeled to expose a braided wire therein in accordance with the terminal managing method of the invention.

Next, we describe a method of producing the above-mentioned end structure. As shown in FIG. 2, the end structure of the shielding wire 15 is so formed that the end 18*a* of the braided wire 18 at least recedes from the end face 17*a* of the inside insulating rind 17 and the end face 19*a* of the outside insulating rind 19 recedes from the end 18*a* of the braided wire 18.

Figure 3:
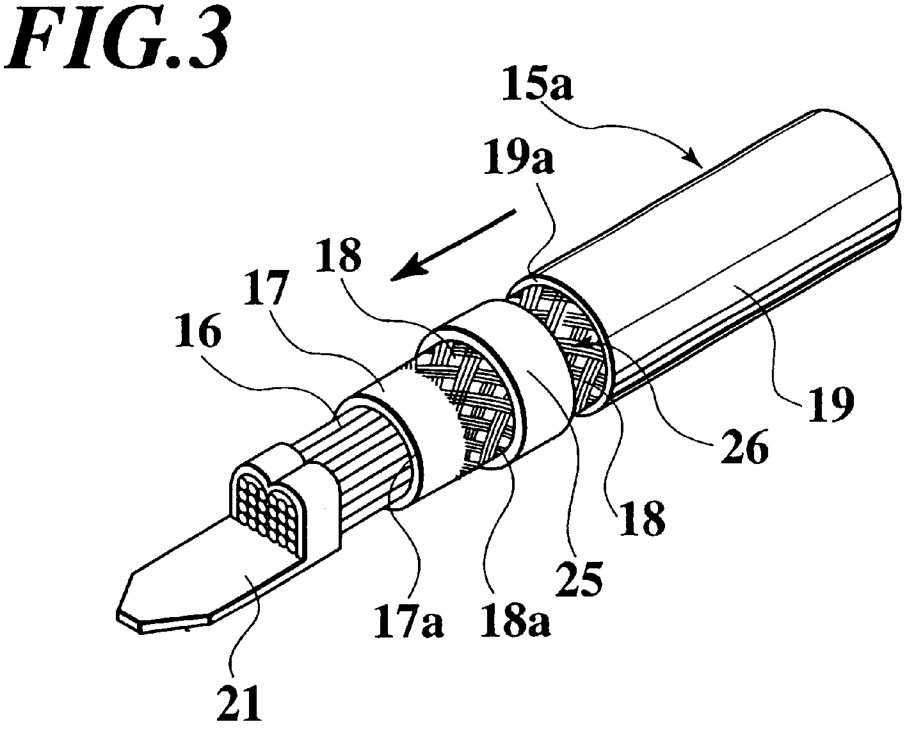
FIG. 3 is a perspective view showing a condition that an end portion of an outside insulating rind at a predetermined length has been cut to form a part for covering the terminal of the braided wire and thereafter, the resulting covering part is being shifted toward the terminal of the braided wire.
Figure 4:
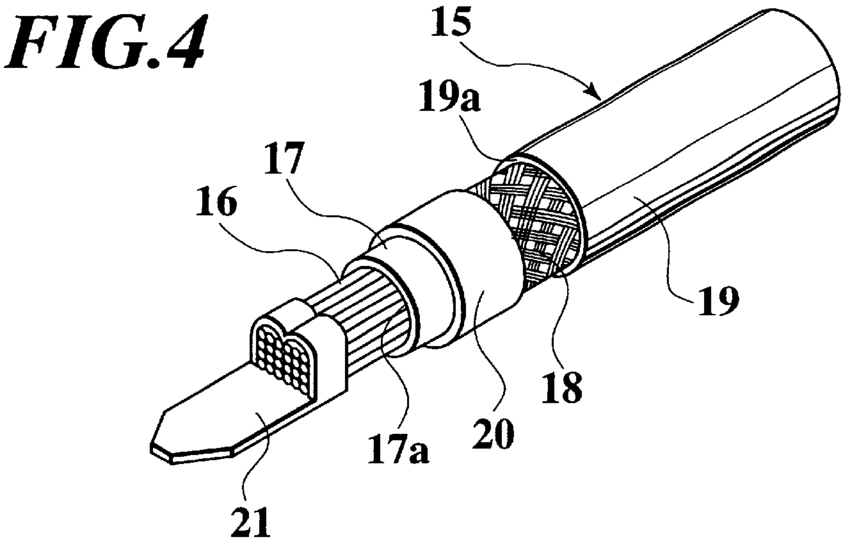
FIG. 4 is a perspective view showing a condition that the terminal of the braided wire is covered-with the covering part.
Figure 5:
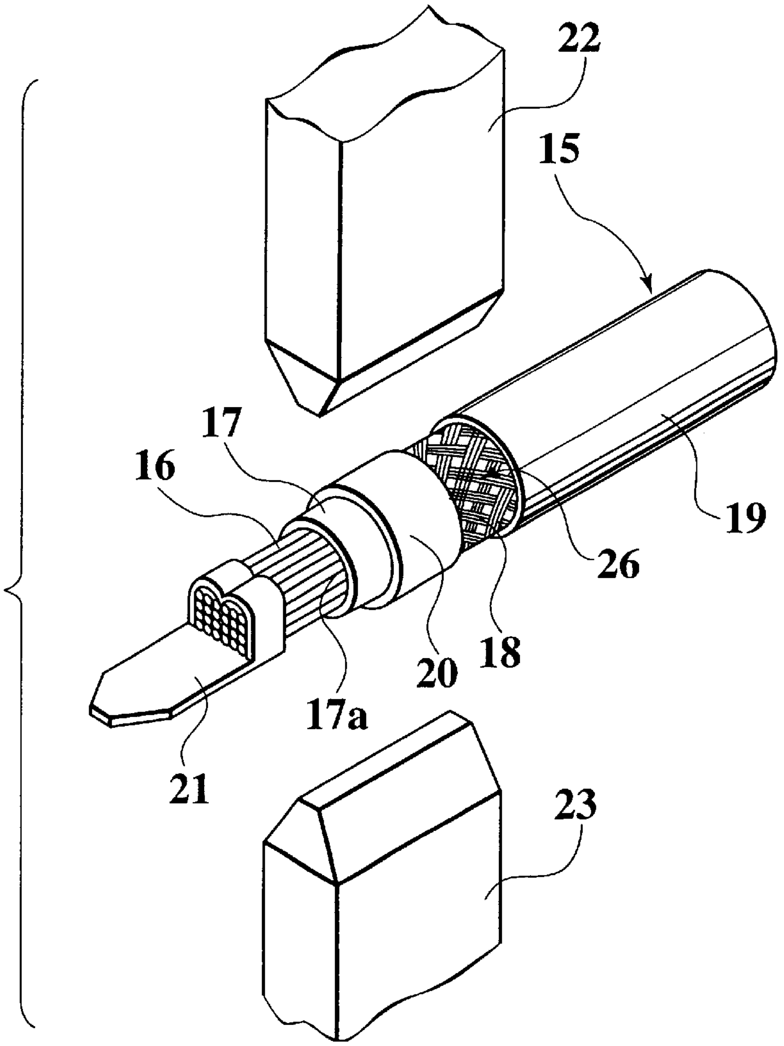
FIG. 5 is a perspective view showing a condition that the covering part is welded to an inside insulating rind of the shielding, in succession from the condition of FIG. 4.

As shown in FIG. 3, an end portion of the inside insulating rind 19 is cut at a predetermined length thereby to form the covering part 20 and sequentially shifted toward the end portion 18*b* of the braided wire 18 in order to cover the portion 18*b* (see FIG. 4). Under such a situation, the inside insulating rind 17 and the covering part 20 are subjected to ultrasonic oscillations between ultrasonic horns 22 and 23, as shown in FIG. 5. Owing to the ultrasonic oscillations, the covering part 20 is welded to the inside insulating rind 17 by the heat that a contact portion 24 between the covering part 20 and the inside insulating rind 17 does generate, as shown in FIG. 1B. Note, in FIG. 1A, reference numeral 25 designates a trace produced on the covering part 20 when pressurizing and oscillating the ultrasonic horn 22.

According to the terminal managing method for the shielding wire 15, since the end portion 18*b* of the braided wire 18 is covered with the covering part 20, there is no possibility that the braided wire 18 begins to be loosen from the end portion 18*b*.

Additionally, according to the method, since there is no need to twist the end portion 18*b* of the braided wire 18 or bind it with tapes in treating the terminal of the shielding wire 15, it is possible to progress the automatic management for the terminal of the shielding wire 15.

Moreover, since the covering part 20 is welded to the inside insulating rind 17 while covering the end portion of the braided wire 18, there can be eliminated a possibility of exposing the end portion 18*b* of the braided wire 18 even though an external force is applied on the portion 18*b*, thereby improving the flexibility of the terminal of the shielding wire 15.

[2nd. embodiment]

Figure 6:
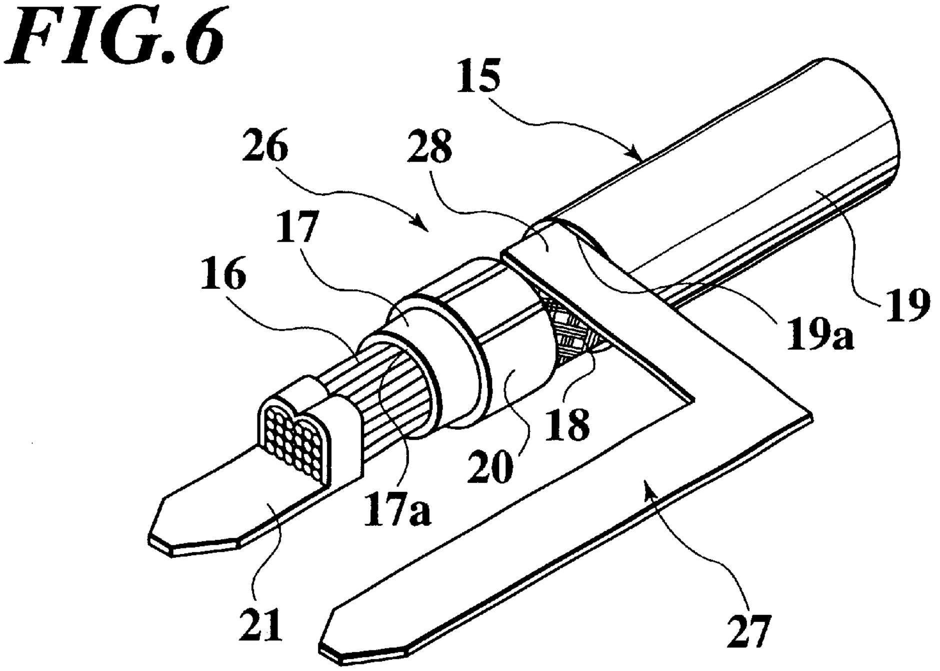
FIG. 6 is a perspective view showing a shielding wire treated by the terminal managing structure and method for the shielding wire, in accordance with a second embodiment of the invention.
Figure 7:
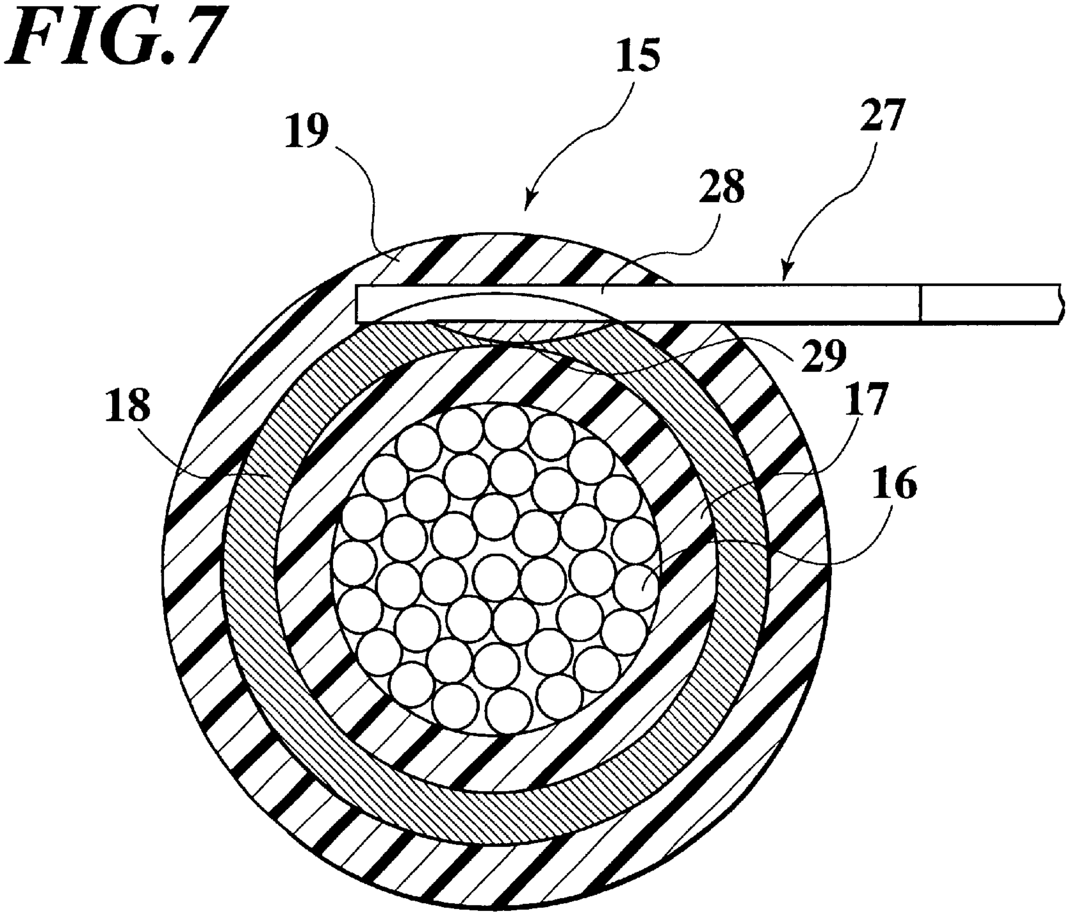
FIG. 7 is a cross sectional view of the shielding wire, showing a condition that an end of a shielding terminal is electrically connected to the braided wire of the shielding wire.
Figure 8:
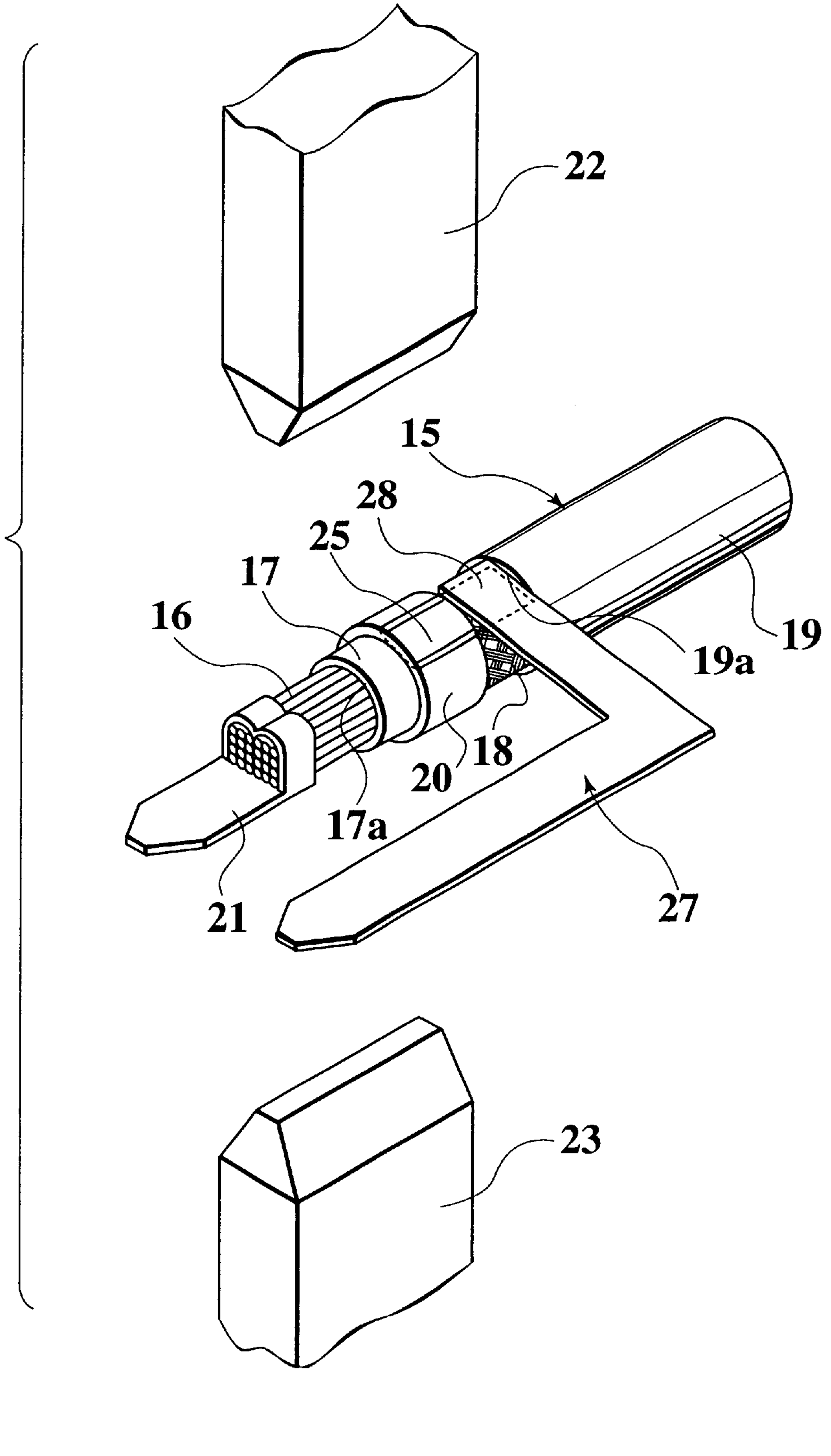
FIG. 8 is a perspective view showing a condition that the end of the shielding wire is electrically connected to the exposed braided wire of the shielding wire.

With reference to FIGS. 6 to 8, we now describe the second embodiment of the present invention. Note, in this embodiment, elements similar to those in the first embodiment are indicated with the same reference numerals, respectively.

According to the second embodiment, a shielding terminal 27 for grounding is conductive-connected to an exposed portion 26 of the braided wire 18, which has been obtained by dividing the end portion of the outside insulating rind 19.

In detail, as shown in FIG. 6, the shielding terminal 27 has a generally L-shaped configuration and has an end portion 28 electrically connected to the exposed portion 26 of the braided wire 18 formed between the covering part 20 and the outside insulating rind 19.

As to the electrical connection between the shielding terminal 27 and the braided wire 18, the end portion 28 of the terminal 27 is metallically joined to the braided wire 18 owing to the fusion of a welding material 29 having a low melting point, as shown in FIG. 7.

In order to conductive-connect the end portion 28 of the shielding terminal 27 with the exposed portion 26 of the braided wire 18, the welding material 29 is firstly painted on the back face of the shielding terminal 27 and then, the end portion 28 of the shielding terminal 27 under the above condition is laid on the exposed portion 26 of the braided wire 18. Next, as shown in FIG. 8, the shielding terminal 27 and the shielding wire 15 are subjected to the ultrasonic oscillations between the ultrasonic horns 22, 23. Due to the ultrasonic oscillations, the welding material is melted by the heat generated between the end portion 28 of the shielding terminal 27 and the braided wire 18, so that the end portion of the terminal 27 is joined with the braided wire 18. In this case, the ultrasonic oscillating is applied on the end portion 28 of the shielding terminal 27 and the braided wire 18 at the same time of welding the covering part 20 with the inside insulating rind 17.

According to the second embodiment, since the end portion 18*b* of the braided wire 18 is covered with the covering part 20, there is no possibility that the braided wire 18 begins to be loosen from the end portion 18*b,* similarly to the first embodiment.

Additionally, according to the method of the embodiment, since there is no need to twist the end portion 18*b* of the braided wire 18 or bind it with tapes in treating the terminal of the shielding wire 15, it is possible to progress the automatic management for the terminal of the shielding wire 15.

Moreover, since the covering part 20 is welded to the inside insulating rind 17 while covering the end portion of the braided wire 18, there can be eliminated a possibility of exposing the end portion 18*b* of the braided wire 18 even though an external force is applied on the portion 18*b,* thereby improving the flexibility of the terminal of the shielding wire 15.

Besides the above-mentioned effects, by joining the end portion 28 of the shielding terminal 27 with the exposed portion 26 of the braided portion 18 through the welding material 29, it is possible to conductive-connect the shielding terminal 27 with the braided wire 18 with ease and reliability.

Furthermore, owing to the using of the welding material having a low melting point, it is possible to improve the reliability in connection between the braided wire 18 and the end portion 28 of the shielding terminal 27.

According to the embodiment, since the ultrasonic oscillating is applied on the shielding terminal 27 and the braided wire 18 simultaneously with the fusing of the covering part 20 and the inside insulating rind 17, the number of manufacturing steps can be reduced thereby to progress the reduction in manufacturing cost.

Again, since the exposed portion 26 of the braided wire 18 is joined to the end portion 28 of the shielding terminal 17, it is possible to make use of the exposed portion 16 effectively.

[3rd. embodiment]

Figure 9:
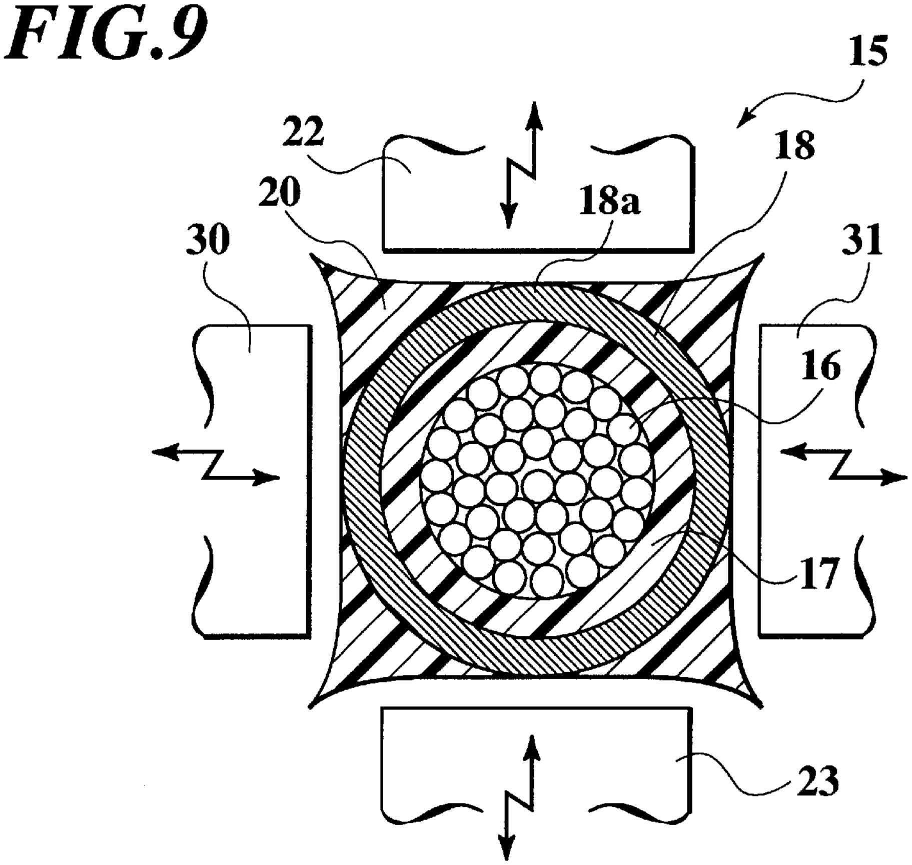
FIG. 9 is a cross sectional view of the shielding wire, showing a condition that the covering part is welded to the inside insulating rind at four circumferential parts of the shielding wire by ultrasonic oscillations, in accordance with a third embodiment of the invention.
Figure 10:
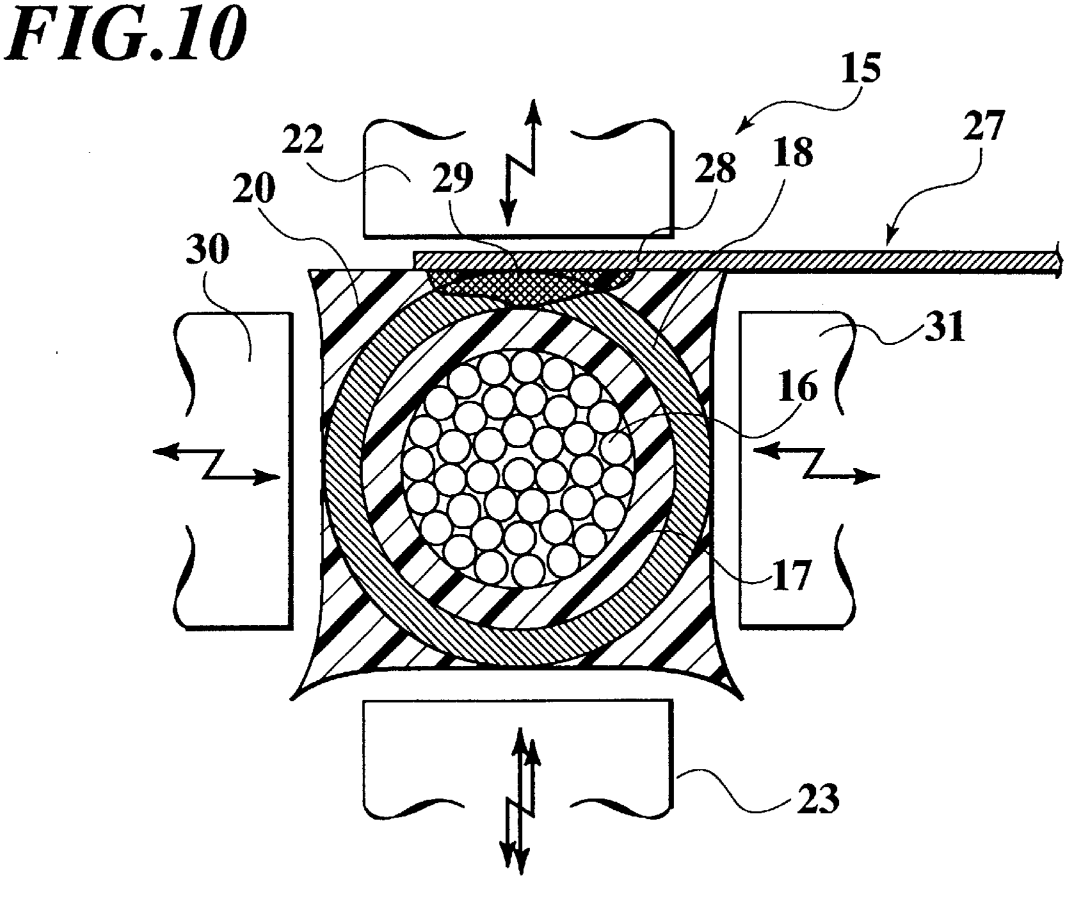
FIG. 10 is a cross sectional view of the shielding wire, showing a welding part between the end of the shielding terminal and the braided wire under condition that the covering part is welded to the inside insulating rind at four circumferential parts of the shielding wire by ultrasonic oscillations, in accordance with the third embodiment of the invention.

With reference to FIGS. 9 and 10, we now describe the third embodiment of the present invention. Note, in this embodiment, elements similar to those in the first embodiment are indicated with the same reference numerals, respectively.

According to the third embodiment, in addition to the ultrasonic oscillation in the upward and downward directions about the shielding wire 15, the ultrasonic oscillation is also applied on the wire 15 in the left and right-handed directions.

That is, as shown in FIG. 9, when welding the covering part 20 to the inside insulating rind 17, the shielding wire 15 is oscillated with ultrasonic waves by not only the ultrasonic horns 22, 23 but right and left-handed ultrasonic horns 30, 31. Thus, the covering part 20 is subjected to the ultrasonic oscillation at four regions in the circumferential direction of the shielding wire 15.

Again, as shown in FIG. 10, also when the braided wire 18 is conductive-connected to the end portion 28 of the shielding terminal 27 together with the welding of the covering part 20 to the inside insulating rind 17, the ultrasonic horns 30, 31 are used for the ultrasonic oscillation, in addition to the upper and lower ultrasonic horns 22, 23.

According to the terminal managing structure and method of the embodiment, in addition to the above-mentioned effects in the first and second embodiments, the end portion 18*b* of the braided wire 18 can be securely covered since the covering part 20 is welded to the inside insulating rind 17 at a plurality of circumferential positions, whereby it is possible to prevent the braided wire 18 from being loosen from the end portion 18*b,* certainly.

[4th. embodiment]

Figure 11:
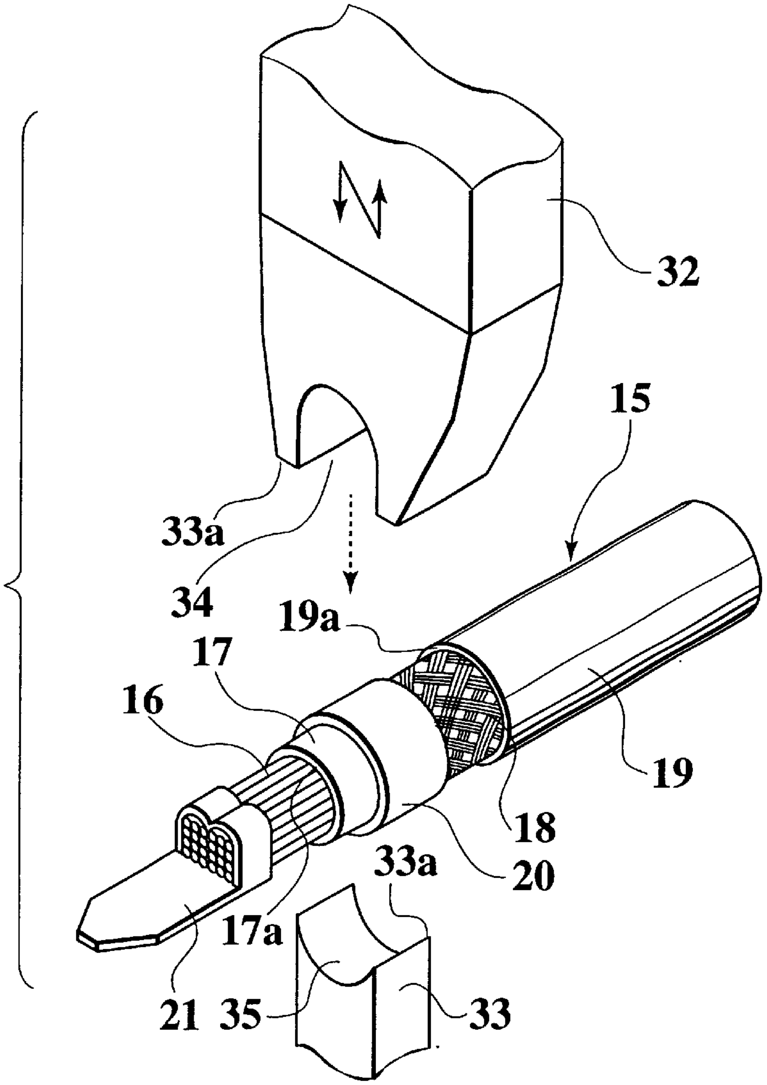
FIG. 11 is a perspective view showing a condition to weld the covering part to the whole inside insulating rind in the circumferential direction by ultrasonic oscillations, in accordance with a fourth embodiment of the invention.
Figure 12:
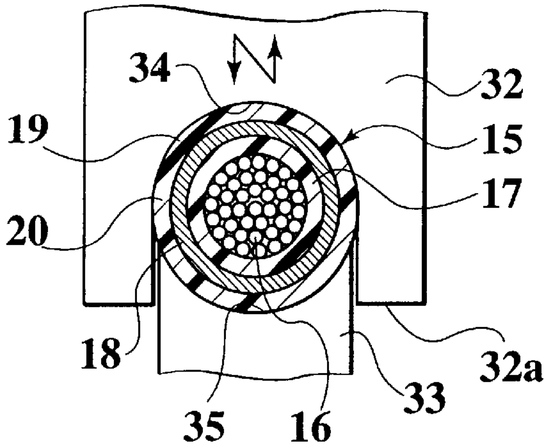
FIG. 12 is a cross sectional view showing a condition where the covering part has been welded to the whole inside insulating rind in the circumferential direction by ultrasonic oscillations, in accordance with the fourth embodiment of the invention.

With reference to FIGS. 11 and 12, we now describe the fourth embodiment of the present invention. Note, in this embodiment, elements similar to those in the first embodiment are indicated with the same reference numerals, respectively.

Different from the third embodiment employing four ultrasonic horns 22, 23, 30 and 31 for the ultrasonic welding, according to the present embodiment, the ultrasonic oscillation is applied on the shielding wire 15 through the whole area in the circumferential direction.

That is, as shown in FIG. 11, when welding the covering part 20 to the inside insulating rind 17, the shielding wire 15 is oscillated with ultrasonic waves by upper and lower ultrasonic horns 32, 33. The upper ultrasonic horn 32 is provided, at a leading face 32*a* thereof, with a notch 34 having an arc-shaped cross section. The notch 34 is shaped so as to contour the profile of the covering part 20. Similarly, the lower ultrasonic horn 33 is provided, at a leading face 33*a* thereof, with a notch 35 having an arc-shaped cross section. Also, the notch 35 is shaped so as to contour the profile of the covering part 20.

As shown in FIG. 12, under condition that the covering part 20 is interposed between the upper ultrasonic horn 32 and the lower ultrasonic horn 33, the lower ultrasonic horn 33 is partially inserted into the upper ultrasonic horn 33, so that respective inner faces of the notches 34, 35 come into contact with the whole area of the covering part 20. When oscillating the shielding wire 15 with the ultrasonic waves under the above-mentioned situation, the covering part 20 is welded to the inside insulating rind 17 through the whole area in the circumferential direction.

Besides the effects similar to those of the second and third embodiments, it is possible to cover the end portion 18*b* of the braided wire 18 certainly, in comparison with the third embodiment, whereby it is possible to prevent the braided wire 18 from being loosen from the end so portion 18*b,* certainly.

Additionally, since the covering part 20 can be welded through the whole circumference, the appearance of the covering part 20 can be improved.

Furthermore, since the covering part 20 is uniformly welded to the inside insulating rind 17 through the whole area in the circumferential direction, it is possible to stick the end portion 18*b* of the braided wire 18 between the covering part 20 and the inside insulating rind 17 strongly.

As the covering part 20 can be welded to the inside insulating rind 17 through the whole area in the circumferential direction in one attempt of the ultrasonic oscillation, it is possible to reduce the number of manufacturing steps and the manufacturing cost, in comparison with the aforementioned three embodiments.

What is claimed is:

1. A method of producing an end structure for a shielding wire including a core part made of conductive material, an inside insulating rind covering said core part, a braided wire arranged about said inside insulating rind and an outside insulating rind arranged about said braided wire to cover said core part, said inside insulating rind and said braided wire, said method comprising the steps of:

forming an end of said shielding wire in a manner that an end of said braided wire at least recedes from an end of said inside insulating rind and an end of said outside insulating rind recedes from the end of said braided wire;

cutting an end portion of said outside insulating rind at a predetermined length, thereby forming a covering part for covering the end of said braided wire;

shifting said covering part toward the end of said inside insulating rind so as to cover the end portion of said braided wire; and welding said inside insulating rind to said covering part while the end portion of said braided wire is covered with said covering part.

2. The method as claimed in claim 1, further comprising the step of:

connecting an end portion of a shielding terminal with said braided wire exposed between said covering part and said end of said outside insulating rind.

3. The method as claimed in claim 2, wherein said covering part is welded to said inside insulating rind by means of ultrasonic oscillation.

4. The method as claimed in claim 3, further comprising the steps of:

putting an end portion of said shielding terminal on said braided wire exposed between said covering part and said end of said insulating rind, the end portion of said shielding terminal being pasted with a welding material having a low melting point; and oscillating the end portion of said shielding terminal and said braided wire with ultrasonic waves together with the welding of said covering part with said inside insulating rind.

5. The method as claimed in claim 3, wherein said covering part is welded to said inside insulating rind at a plurality of regions in the circumferential direction of said shielding wire by means of ultrasonic oscillation.

6. The method as claimed in claim 3, wherein said covering part is welded to said inside insulating rind through a whole area thereof in the circumferential direction of said shielding wire by means of ultrasonic oscillation.

7. An end structure for a shielding wire including a core part made of conductive material, an inside insulating rind covering said core part, a braided wire arranged about said inside insulating rind and an outside rind arranged about said braided wire to cover said core part, said inside insulating rind and said braided wire, said end structure comprising:

a covering part which is separated from an end of said outside insulating rind so as to cover the circumference of an end portion of said braided wire, the end of said outside insulating rind being positioned so as to recede from an end of said braided wire to the opposite side of a leading end of said shielding wire, the covering part extending beyond an end of the braided wire over said inside insulating rind, the covering part being welded to said inside insulating rind in the vicinity of the end of said braided wire, a shielding terminal which is connected with said braided wire between said covering part and said end of said outside insulating rind;

wherein said shielding terminal has an end portion pasted with a welding material having a low melting point and the end portion of said shielding terminal is conductively connected to a portion of said braided wire between said covering part and the end of said outside insulating rind through said welding material by means of ultrasonic oscillation.

8. The end structure as claimed in claim 7, wherein the end portion of said shielding terminal is conductively connected to the portion of said braided wire between said covering part and the end of said outside insulating rind at the same time of welding said covering part to said inside insulating rind by means of ultrasonic oscillation.

* * * * *

UNITED STATES PATENT AND TRADEMARK OFFICE
CERTIFICATE OF CORRECTION

PATENT NO. : 6,239,373 B1
DATED : May 29, 2001
INVENTOR(S) : Kei Sato et al.

It is certified that error appears in the above-identified patent and that said Letters Patent is hereby corrected as shown below:

Title page,
Item [57], ABSTRACT, line 9, "loosen" should read -- loosened --.

Signed and Sealed this

Ninth Day of April, 2002

*Attest:*

JAMES E. ROGAN
*Director of the United States Patent and Trademark Office*

*Attesting Officer*